United States Patent [19]

Ueda et al.

[11] Patent Number: 4,819,106
[45] Date of Patent: Apr. 4, 1989

[54] HEAD POSITIONING ASSEMBLY FOR MAGNETIC DISC APPARATUS

[75] Inventors: Takaharu Ueda; Takashi Yumura; Kiyosi Funai; Tetsu Yamamoto, all of Amagasaki, Japan

[73] Assignee: Mitsubishi Denki Kabushiki Kaisha, Japan

[21] Appl. No.: 3,418

[22] Filed: Jan. 15, 1987

[30] Foreign Application Priority Data

Jan. 16, 1986 [JP] Japan .................................. 61-8280

[51] Int. Cl.$^4$ .............................................. G11B 5/55
[52] U.S. Cl. ................................................... 360/106
[58] Field of Search .......................................... 360/106

[56] References Cited

U.S. PATENT DOCUMENTS 4,414,594 11/1983 Farmer et al. ...................... 360/106

FOREIGN PATENT DOCUMENTS 61-45476 3/1986 Japan .

OTHER PUBLICATIONS

IBM-TDB, vol. 17, No. 4, Sep. 1974, pp. 1159–1160; Magnetic Recording Disk Track Access Mech.; L. A. Granger.

*Primary Examiner*—A. J. Heinz
*Attorney, Agent, or Firm*—Leydig, Voit & Mayer

[57] ABSTRACT

A carriage of a head positioning assembly is disposed along an edge of a magnetic disc so as not to come in contact with the magnetic disc, whereby the length of the winding bobbin of the voice coil can be elongated, so that a driving force generated in the elongated winding bobbin causes a magnetic read and write head to rapidly move to a position over an objective track on the magnetic disc.

3 Claims, 6 Drawing Sheets

FIG. I
PRIOR ART

HEAD POSITIONING ASSEMBLY FOR MAGNETIC DISC APPARATUS

BACKGROUND OF THE INVENTION

The present invention generally relates to a magnetic disc apparatus, and more particularly, to a head positioning assembly for a magnetic disc apparatus.

FIG. 1 is a plan view of one example of a conventional head positioning assembly for use in the magnetic disc apparatus and FIG. 2 is a perspective view of the head positioning assembly.

The conventional magnetic disc apparatus shown in FIGS. 1 and 2 comprises a disc drive assembly 1 disposed on a base (not shown) and a head positioning assembly 2 disposed on the base in a predetermined relationship with respect to the disc drive assembly 1. The disc drive assembly 1, which drives a magnetic disc 11 upon which magnetic recording and reproducing are achieved comprises a rotary shaft 12 by which the disc 11 is supported and a drive unit 13 for driving the shaft 12.

The head positioning assembly 2 for positioning a read and write head 21 comprises a suspension 22 which supports at one end thereof the head 21, a carriage 23, a pair of cylindrical guide rails 24a and 24b, a pair of flat guide rails 25a and 25b, an E shaped yoke 26 and a pair of magnets 27a and 27b (27b being invisible in the Figures.) mounted on inner side walls of both side legs of the E shaped yoke 26, the yoke 26 and magnets 27a and 27b together constituting a magnetic circuit which is fixedly mounted on the base (not shown) or the housing (not shown) of the magnetic disc apparatus.

The carriage 23 comprises an arm 32 extending from one end of the carriage 23 and has secured at the extnding end thereof the suspension 22, and a voice coil 34 mounted on the carriage 23. The voice coil 34 movably receives therein the center leg of the E shaped yoke 26. The carriage 23 further comprises two pairs of linear bearings 35a and 35b, and 35c and 35d provided on lower portions of the respective sides of the carriage 23, and one pair of linear bearings 36a and 36b provided on upper portions of the respective sides of the carriage 23. The carriage 23 is movably mounted on the pair of cylindrical guide rails 24a and 24b through the linear bearings 35a and 35b, and 35c and 35d. The carriage 23 is further supported by the pair of flat guide rails 25a and 25b through the linear bearings 36a and 36b, whereby, the guide rails 25a and 25b serve to stabilize the carriage 23 regardless of the level position of the magnetic disc apparatus.

When a current is applied to the voice coil 34, a magnetic field is generated around the windings thereof, the generated magnetic field of the magnets 27a and 27b generating a driving force to move the carriage 23 together with the head 21 in the direction of an arrow A or A' shown in FIG. 1. Since the disc 11 is disposed along one end of the carriage 23, the movement of the carriage 23 in the direction of travel A and A' causes the head 21 to move in the radial direction of the disc 11, thereby allowing for the accurate positioning of the head 21 at an objective track on the disc 11.

The thus constructed conventional magnetic disc apparatus has problems in that, when a larger driving force is required, it is necessary to increase the effective area of the winding of the voice coil 34. For this purpose, the length of the voice coil 34, i.e. length of the bobbin upon which the winding is wound, has to be elongated. However, since the disc is disposed at one end of the carriage 23, the head 21 is radially moved in the direction of travel A or A' of the carriage 23, which makes it difficult to increase the length of the bobbin within a specified dimension of an external storage housing (not shown), and in order to further increase the driving force, the depth of the external storage housing or the length thereof has to be elongated in the direction that the other end of the carriage 23 becomes distant from the rotary shaft 12 of the disc drive assembly 1.

SUMMARY OF THE INVENTION

Accordingly, an object of the present invention is to provide a head positioning assembly free from the above described problems.

In the head positioning assembly for the magnetic disc apparatus according to the present invention, the disc is disposed along one side of a carriage such that the one end of the carriage does not come in touch with the disc in the direction of travel thereof. The head is mounted on the carriage through a suspension and an arm so as to move radially with respect to the disc and in a parallel relationship with respect to the moving direction of the carriage.

BRIEF DESCRIPTION OF THE DRAWINGS

The present invention will become more readily apparent from the following detailed description of the preferred embodiments of the invention taken in conjunction with the accompanying drawings, in which.

DESCRIPTION OF THE PREFERRED EMBODIMENTS

Figure 1:
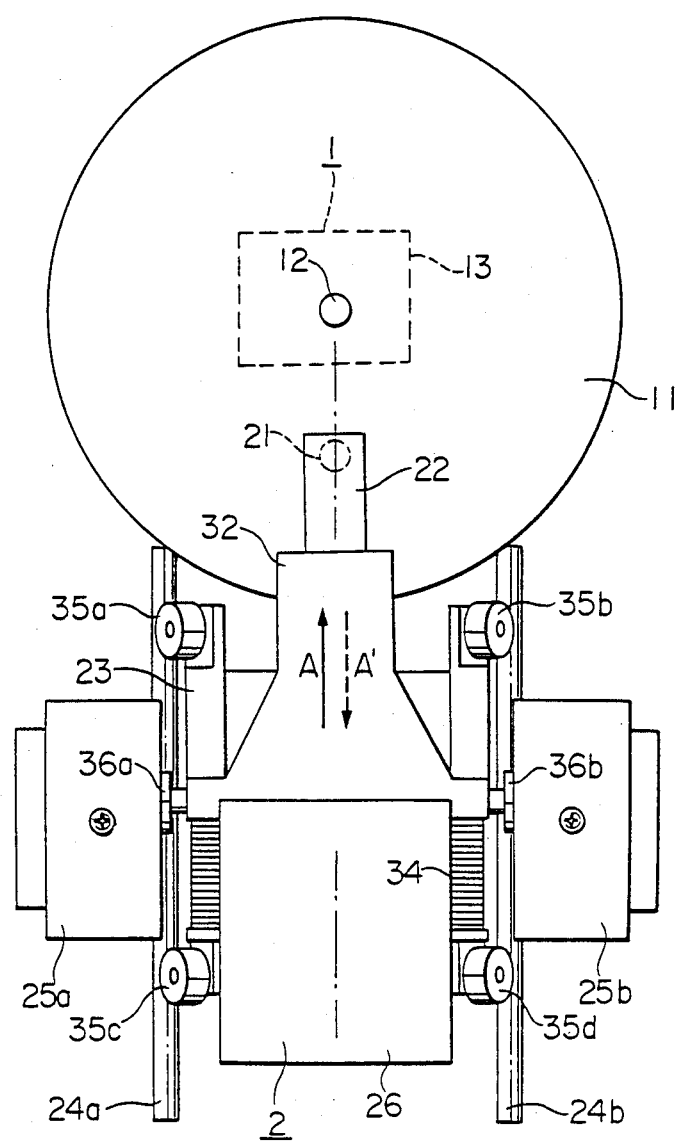
FIG. 1 is a plan view of one example of the conventional magnetic disc apparatus.
Figure 2:
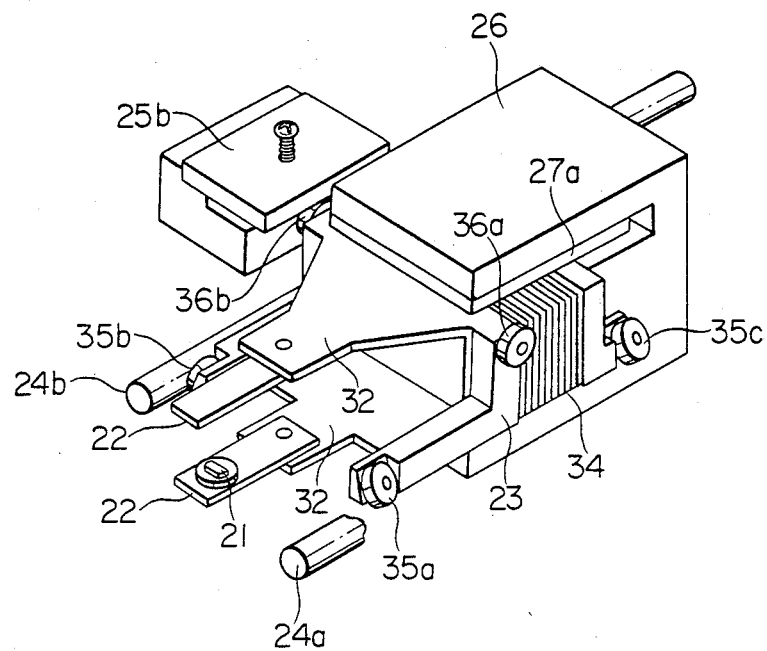
FIG. 2 is a perspective view of a conventional head positioning assembly for use in the magnetic disc apparatus.

A magnetic disc apparatus according to the present invention is similar to the conventional magnetic disc apparatus in that both apparatuses comprise a disc drive assembly 1 disposed on a base (not shown) and a head positioning assembly 2 or 40 disposed on the base in a predetermined relationship with respect to the disc drive assembly 1 as above described. However, the head positioning assembly 40 of the present invention is different from the conventional assembly 2 in its structure as well as positional relation thereof with respect to the magnetic disc apparatus.

In FIGS. 3 to 7 in which one embodiment of the present invention is illustrated, the head positioning assembly 40 of the present invention comprises a pair of guide rails 43a and 43b which are cylindrical rods, a carriage 46 mounted on the guide rails 43a and 43b for guided linear movement therealong, a support arm 47 extending from the carriage 46 for supporting a magnetic read and write head 41 on a proper position on the magnetic disc 11, and a drive unit 52 for moving the carriage 46 along the guide rails 43a and 43b.

Figure 3:
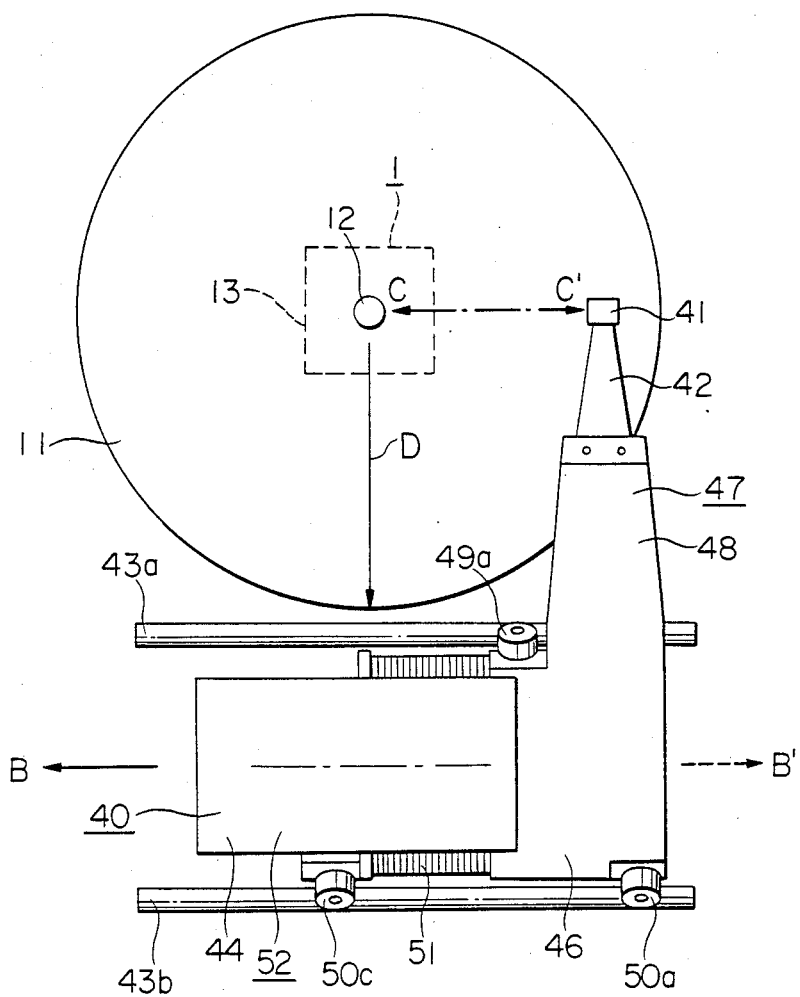
FIG. 3 is a plan view of a head positioning assembly for a magnetic disc apparatus according to the present invention.

According to the present invention, the guide rails 43a and 43b are straight and extend parallel to a tangent to the disc in the direction perpendicular to a first radial direction of the magnetic disc 11 represented by the arrow D as apparent from FIG. 3. The guide rails and carriage are located at the edge of the disc substantially totally within a region between the ends of the guide rails which is aligned with the disc in the first radial direction represented by the arrow D. It is also seen that the the guide rails 43a and 43b are outside of the horizontal projection of the disc 11 in a second radial direction represented by the arrows C so that the carriage 46 does not interfere with the magnetic disc 11.

The carriage 46 which is a substantially rectangular tubular member includes three pairs of guide rollers 49a and 49b; 50a and 50b; and 50c and 50d for the guided linear movement along the guide rails 43a and 43b. As seen from FIGS. 3 and 4, the guide rollers 49a and 49b engage the guide rail 43a and the guide rollers 50a and 50b; 50c and 50d engage the guide rail 43b. The tubular member has wound thereon an electromagnetic coil 51 and is electromagnetically associated with the magnetic yoke 44 so that an electromagnetic drive unit is constituted. The support arm 47 includes an integral arm 48 extending from the carriage 46 in the direction perpendicular to the guide rails 43a and 43b toward the magnetic disc 11. The support arm 47 also includes an elastic suspension 42 secured at its one end to the free end of the arm 48. The suspension 42 extends in the same direction as the arm 48 and supports the magnetic head 41 at its free end. The length of the support arm 47 is selected such that the magnetic head 41 is supported for movement parallel to and spaced laterally of the guide rails 43a and 43b and is movable in a second radial direction of the magnetic disc 11 which is perpendicular to the previous-mentioned first radial direction of the disc 11. In other words, the movement of the head 41 is along the line passing through the center of the magnetic disc 11 and parallel to the guide rails 43a and 43b.

The drive unit comprises a substantially E-shaped yoke 44 including two side legs and one central leg extending in parallel with respect to each other, a pair of permanent magnets 45a and 45b attached on the inner faces of the side legs of the yoke 44, and a voice coil 51 mound on the tubular carriage 46. The central leg of the E-shaped magnetic yoke 44 is loosely inserted into the tubular carriage 46 so that an electromagnetic drive force is generated between the coil 51 on the carriage 46 and the magnetic yoke 44.

When a current is applied to the voice coil 51, a magnetic field is generated around the windings thereof, the generated magnetic field of the magnets 45a and 45b generating a driving force to move the carriage 46 in the directions designated by arrows B and B' in FIG. 3. Accordingly, since the length of the arm 48 and the suspension 42 is such that the head 41 crosses over the center of the disc 11, the head 41 moves in the radial direction of the disc 11 in two directions designated by arrows C and C', and in a parallel relationship with respect to the direction of movement of the carriage 46.

As can be seen from the above description, since the disc 11 is disposed along one side of the carriage 46, one end of the carriage 46 does not come in contact with the disc 11, and the length of the voice coil 51 (i.e. length of the bobbin upon which the winding is wound) can be increased as compared with that of the voice coil 34 of the conventional head positioning assembly, thereby increasing the driving force of the voice coil 51, so that the head can be more quickly positioned. Because the guide rails, carriage, and voice coil are substantially totally within a region aligned with the disc in the first radial direction, the overall dimensions of the external storage unit housing are substantially the same and the external storage apparatus can be made compact, as compared with the conventional apparatus shown in FIG. 1.

Figure 4:
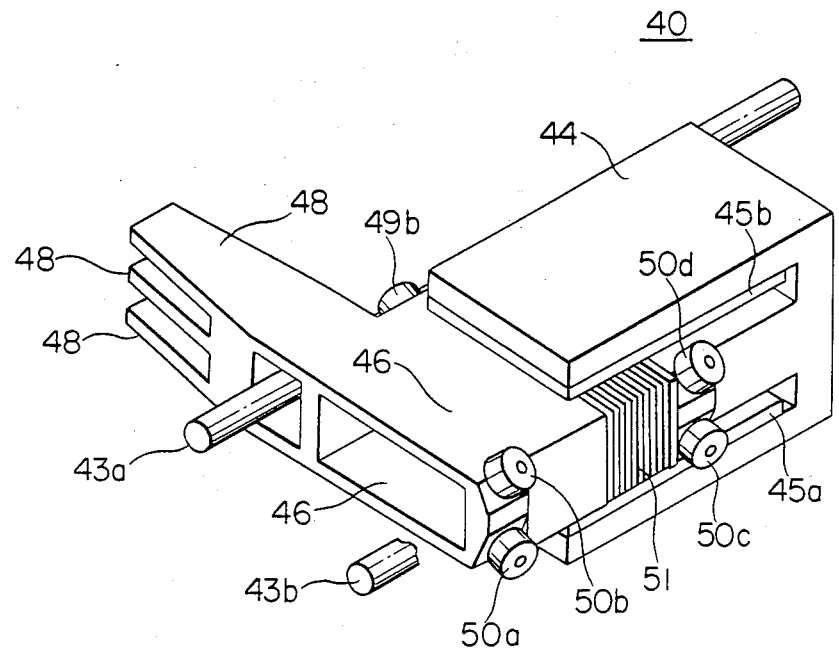
FIG. 4 is a perspective view of the head positioning assembly in FIG. 3.
Figure 7:
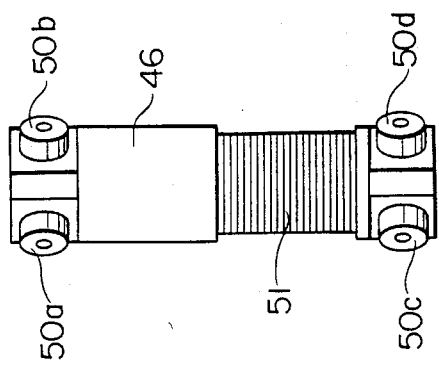
FIG. 7 is a right side view of the carriage shown in FIG. 5.
Figure 5:
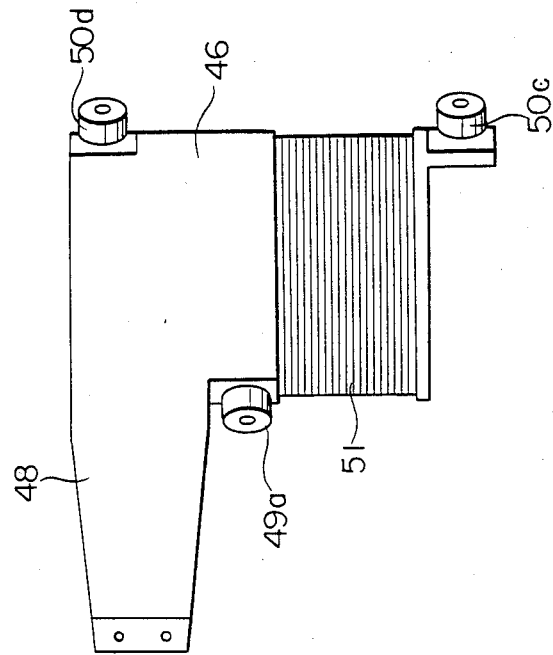
FIG. 5 is a plan view of a carriage of the head positioning assembly according to one embodiment of the present invention in FIG. 4.
Figure 6:
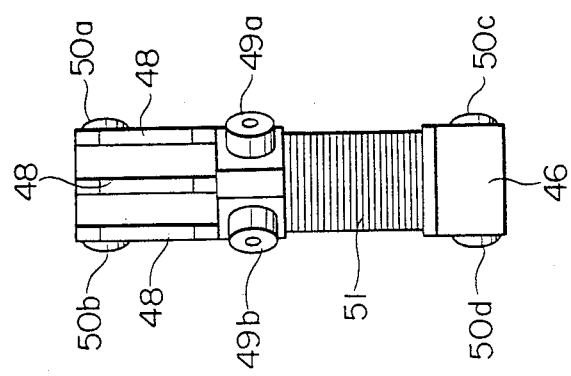
FIG. 6 is a left side view of the carriage shown in FIG. 5.
Figure 8:
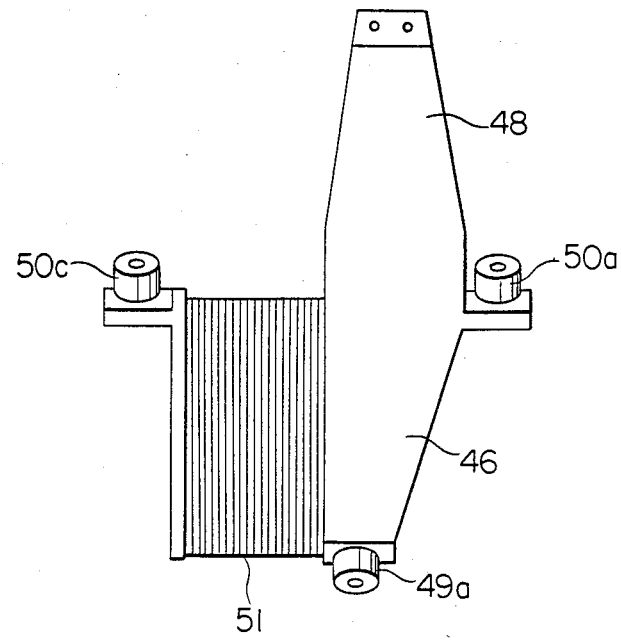
FIG. 8 is a plan view of a carriage of the head positioning assembly according to another embodiment of the present invention.

In the above embodiment, as illustrated in FIGS. 4 and 5, the carriage 46 is provided at the one side thereof with one pair of first linear bearings 49a and 49b and at the other side thereof with two pairs of second linear bearings 50a and 50b; 50c and 50d. It should be noted that the carriage 46 may be provided at the one side thereof with two pairs of linear bearings and at the other side thereof with one pair of linear bearings 49a and 49b as shown in FIG. 8, thereby providing the same effect as that of the above stated embodiment.

What is claimed is:

1. A magnetic read-and-write head positioning assembly of a magnetic disc apparatus including a magnetic disc rotatable about its center, the positioning assembly comprising:

a guide rail extending parallel to a tangent to an edge of the disc and located adjacent the edge of the disc at a radius extending in a first radial direction from the center of the disc;

a carriage mounted on said guide rail for movement therealong, one side of said carriage being movable along a path tangent to the edge of the disc;

supporting means extending from said one side of said carriage perpendicularly to said guide rail and directly over a face of the disc for supporting the magnetic read-and-write head over the face of the disc, the magnetic read-and-write head being movable by said carriage in a path parallel to the path of carriage movement and perpendicular to said supporting means and intersecting the center of the disc; and driving means including a voice coil mounted on said guide rail adjacent the edge of the disc and positioning means provided on said carriage and cooperating with said voice coil for producing a driving force to position said carriage along said guide rail;

said guide rail, said carriage, and said driving means being disposed at the edge of the disc substantially totally enclosed within a region (a) aligned with the disc in the first radial direction thereof, (b) bounded on two ends by parallel lines which are tangent to opposite edges of the disc and extend perpendicularly to said guide rail, and (c) bounded on two sides by parallel lines one of which is tangent to the edge of the disc and extends parallel to said guide rail and the other of which is spaced outwardly from the edge of the disc.

2. A magnetic read-and-write head positioning assembly wherein said supporting means comprises an arm extending from said carriage perpendicularly to said guide rail.

3. A head positioning assembly as claimed in claim 1 including a second guide rail extending parallel to said first mentioned guide rail, said guide rails being located at the two sides of the enclosed region.

* * * * *